US005537467A

United States Patent [19]

Cheng et al.

[11] Patent Number: 5,537,467
[45] Date of Patent: Jul. 16, 1996

[54] METHOD FOR FORWARDING A CALL TO A TEMPORARILY UTILIZED PORTABLE TELEPHONE

[75] Inventors: Wang J. Cheng, Martinsville; Lee-Tin Cheng, East Brunswick; Munir Cochinwala, Basking Ridge; Kuo-Chu Lee, Princeton Junction; Cheng-Chung Liu, Warren; Thomas L. Wise, Piscataway, all of N.J.

[73] Assignee: Bell Communications Research, Inc., Morristown, N.J.

[21] Appl. No.: 294,461

[22] Filed: Aug. 23, 1994

[51] Int. Cl.⁶ .................................................. H04M 3/54
[52] U.S. Cl. ........................ 379/211; 379/58; 379/210; 379/201; 379/221
[58] Field of Search ........................ 379/95, 96, 112, 379/201, 207, 211, 212, 221, 230, 269, 57, 56, 58, 59, 60, 196

[56] References Cited

U.S. PATENT DOCUMENTS

| | | | |
|---|---|---|---|
| 4,866,763 | 9/1989 | Cooper et al. | 379/221 |
| 5,008,929 | 4/1991 | Olsen et al. | 379/112 |
| 5,031,211 | 7/1991 | Nagai et al. | 379/221 |
| 5,222,123 | 6/1993 | Brown et al. | 379/212 |
| 5,243,645 | 9/1993 | Bissell et al. | 379/211 |
| 5,282,244 | 1/1994 | Fuller et al. | 379/221 |
| 5,329,578 | 7/1994 | Brennan et al. | 379/196 |
| 5,353,331 | 10/1994 | Emery et al. | 379/67 |
| 5,375,161 | 12/1994 | Fuller et al. | 379/211 |
| 5,384,851 | 1/1995 | Creswell et al. | 379/211 |
| 5,425,090 | 6/1995 | Orriss | 379/230 |
| 5,430,719 | 7/1995 | Weisser, Jr. | 379/95 |

OTHER PUBLICATIONS

M. Cochinwala, et al., "Distributed Transaction Monitor" Third International Workshop on Research Issues on Data Engineering: Interoperability In Multidatabase Systems, Vienna, Austria, Apr. 18–20, 1993, pp. 268–272.

J. Pons et al., "Mixed Concurrency Control: Dealing with Heterogeneity in Distributed Database Systems," Proc. of the Fourteenth Conference on VLDB, Los Angeles, 1988, pp. 445–456.

*Primary Examiner*—Jeffery Hofsass
*Assistant Examiner*—Scott Wolinsky
*Attorney, Agent, or Firm*—Leonard Charles Suchyta; James W. Falk

[57] ABSTRACT

A distributed service management system for providing communication services comprises a plurality of individual service management systems operated by a plurality of different service providers. Each service management system includes its own local database and an Interactive Distributed Transaction Monitor (IDTM) that allows locally running applications to access the local database as well as remote databases belonging to remotely located service management systems. The interfaces serve to integrate multiple individual service management systems into a single multidatabase transaction management system. The distributed service management system can be used to provide special personal communication services involving multiple service providers, such as call forwarding to a temporarily rented mobile telephone.

3 Claims, 4 Drawing Sheets

METHOD FOR FORWARDING A CALL TO A TEMPORARILY UTILIZED PORTABLE TELEPHONE

FIELD OF THE INVENTION

The present invention relates to a distributed service management system and method to support the fast deployment of personal communication services. Specifically, the present invention enables a nomadic user to subscribe to, activate, and use personal communication services anywhere and at any time without interoperability problems among different personal communication service providers and phone companies.

BACKGROUND OF THE INVENTION

One important goal of personal communication services is to allow users to communicate from anywhere to anywhere at any time. Such personal communication services generally involve multiple service providers including local and long distance telephone companies and cellular telephone companies. An example of a personal communication service is as follows:

A personal communication service provider (e.g., a cellular telephone company) enables traveling users to rent a wireless portable phone from a rental phone company (e.g., from an airline or car rental company). A sales representative travels from a home location e.g., New Jersey, to a visiting location, e.g., California. In order to get in touch with his/her boss and his/her home, the user rents a wireless portable phone immediately upon arrival in California. Using the rental phone, the user is provided with basic mobile phone service from the personal communication service provider. In addition, the user would like the following features:

1) The user wants calls directed to his/her office or home to be automatically forwarded to the rental portable phone, without informing anyone that he/she is traveling.
2) To avoid unimportant incoming calls, (and corresponding incoming call charges), the user would like to restrict the number of people who can call the rented portable phone.
3) It is important to the user that the rental phone features be activated instantly, so that calls can be made immediately upon the user's arrival at the visiting location.

This kind of personal communication service involves a plurality of service providers. There are (a) the local telephone company at the home location, (b) a long distance telephone company, (c) the local telephone company at the visiting location, and (d) the personal communication service provider (i.e. the cellular telephone company) at the visiting location. All of these are referred to herein as "service providers".

To enable this kind of personal communication service, involving multiple service providers, interoperability problems among the different service providers must be resolved. The interoperability problems can be divided into two categories: (a) location tracking and (b) service management.

The interoperability problem for location tracking has been addressed by adopting signaling protocols used by the mobile phone industry. Location tracking functions are implemented using two location registers. One of the registers, maintained by the local telephone company of the user's home location, is called the Home Location Register (HLR). The other register, maintained by the local telephone company of the visiting location, is called the Visiting Location Register (VLR). The HLR stores the customer profile data and the location of the VLR of the user. The customer profile data contains important information such as the user name/address, preferred long distance carrier, service features (e.g., call forwarding and call restriction), billing, and other administrative related information. When the user travels to a new visiting location (e.g., from New Jersey to California), a new VLR is created in the new location. A part of the profile data is loaded into the VLR such that the service provider at the visiting location can implement service features (e.g. call restriction) for the visiting user. The location of VLR in the HLR is changed to the new VLR location, and the VLR in the previously visited location is deleted. The process of creating a new VLR, loading profile data to the VLR, and updating the visiting location of a user in the HLR is called "automatic roamer registration".

The interoperability problem for service management is much more complex than that for location tracking. Service management refers to a collection of functions required to enable a personal communication service user to subscribe to, modify, and activate service features anywhere and at any time. Examples of service management functions include phone number administration, customer profile data management, service activation, and security administration. The phone number administration function is important for maintaining the uniqueness of phone numbers. The customer profile data management function provides customer profile databases and user interfaces for creating, modifying or transferring such databases. The service activation function extracts part of the data specifying service features from the profile data and loads this data into physical communication systems that process calls. The service activation function also controls the activation and deactivation of the service features. The security administration function prevents or detects unauthorized uses of services and service management functions.

Service management functions of this type need to be implemented to provide personal communication services involving multiple service providers. Such implementation of the service management functions generally requires interactions between application software and various databases owned and operated by the different service providers. Consider an application which enables a nomadic user to subscribe to a personal communication service from any service provider at any location. An example of such a service is call forwarding to a temporarily rented portable phone. The application may, for example, need to perform the following database access operations at databases maintained by various different service providers:

- check credit databases owned by credit card companies or phone companies to determine whether the user is able to pay for the service;
- check the customer profile database in the user's HLR to determine whether the user is currently located in a place other than the visiting location currently stored in the HLR;
- check the credit and network databases of long distance phone companies specified by the user to determine whether the user can use a particular long distance carrier in the visiting location;
- load profile data into the VLR at the visiting location and update the HLR with the location of the VLR if necessary; and
- load the profile data to the call processing systems and activate the service.

In view of the foregoing, it is an object of the invention to provide a service management system and method to implement the above-described service management functions by accessing databases of multiple service providers, so that personal communication services involving multiple service providers can be made available to users in a rapid and reliable fashion.

It is a further object of the invention to provide a distributed service management system comprising a plurality of individual service management systems operated by a plurality of individual service providers to implement the above-identified service management functions.

It is another object of the invention to provide a distributed service management system which is formed from a plurality of individual service management systems operated by individual service providers without significantly modifying the individual service management systems.

It is also an object of the invention to provide a service management system which can be used to provide new, heretofore unavailable, personal communication services.

Specifically, it is an object of the invention to provide enhanced personal communication services on a temporary basis to nomadic users, examples of such services including (a) call forwarding from a user's base telephone to a mobile telephone; and (b) the restriction of incoming calls to a mobile telephone.

SUMMARY OF THE INVENTION

The present invention is directed to a distributed service management system which comprises a plurality of individual service management systems operated by different service providers. The service providers include, for example, local telephone companies, long distance telephone companies and cellular telephone companies. The individual service management systems are interconnected by a telecommunications network. A local database is located at each individual service management system. This local database contains customer profile records (CPR) and credit records, for example. Each individual service management system includes a database management system for managing the local database.

Each individual service management system has an Interactive Distributed Transaction Monitor (IDTM). The IDTM provides an interactive, message based interface that allows applications to access data stored in the local databases of different individual service management systems. An illustrative application enables a user to subscribe to a service which forwards calls to a temporarily rented portable phone. The IDTM comprises multiple processes known as agents. The agents in each IDTM encapsulate the local database by acting as an intermediary for all applications (locally originated or remotely originated) that need to access the local database. The IDTM at each individual service management system also includes a transaction manager and a communication manager.

A local application connects to local and remote databases by first registering with the transaction manager at the local service management system. When a transaction manager receives a registration request, the transaction manager allocates an agent and connects the agent to the application. The allocated agent is called the coordinator. The coordinator agent will perform local database accesses for the application. The application may require access to a remote database located at a remote service management system. In this case, the coordinator will request the local transaction manager to communicate with the transaction manager at the remote service management system to allocate a remote agent to the application to enable the application to access the remote database.

Each IDTM agent comprises several modules for performing the following functions: database access, persistent storage, concurrency control, commit protocol, and event detection. An application issues standard database operations, such as read, write, or commit. These operations are executed by the agents in the IDTMs.

The use of the IDTMs is highly advantageous. The installation of an IDTM at each individual service management system to be incorporated in the distributed service management system does not significantly alter the individual service management systems. Thus, the distributed service management system may easily be formed from existing individual service management systems. Because the IDTM is an intermediary between the application and the databases, the particular database management system used at each individual service management system need not be altered to form the distributed service management system.

The distributed service management system of the present invention can perform database operations at the service management systems of multiple service providers so that enhanced personal communication services can be provided to users.

Consider the case of providing a call forwarding service to a user who rents a portable phone at a visiting location (e.g., the case of the user who rents a portable phone at an airport). The distributed service management system performs the following functions involving multiple database accesses to enable a user to subscribe to this service:

1) check credit records at the service management systems of all the service providers involved in the service to make sure the user can pay for the service.

2) check the customer profile in a user's Home Location Register to determine if the visiting location stored therein is different from the user's actual current visiting location;

3) check the credit and network database of long distance carriers specified by the user to make sure the user can actually utilize a particular long distance carrier from the visiting location;

4) load profile data into the Visiting Location Register at the visiting location and update the Home Location Register with the location of the Visiting Location Register if necessary.

5) load profile data to particular call processing systems (e.g. service control points, central offices, or switches) to activate the service. For example, the switching performed at one or more central office switches may be changed so that when the user's base telephone number is called, the call is switched to another location to implement call forwarding.

Again, it should be noted that the service management functions are carried out using a distributed service management system comprised of individual service management systems which communicate by messages transmitted by the IDTMs.

DETAILED DESCRIPTION OF THE INVENTION

For purposes of clarity, the detailed description of the invention is divided into two parts. Part A describes the architecture of the inventive distributed service management system and describes in detail the IDTM's utilized therein. Part B describes how a prototypical service (i.e., personalized services for a temporary portable phone user) may be implemented using a distributed service management system of the present invention.

A. Distributed Service Management System Process

Figure 1:
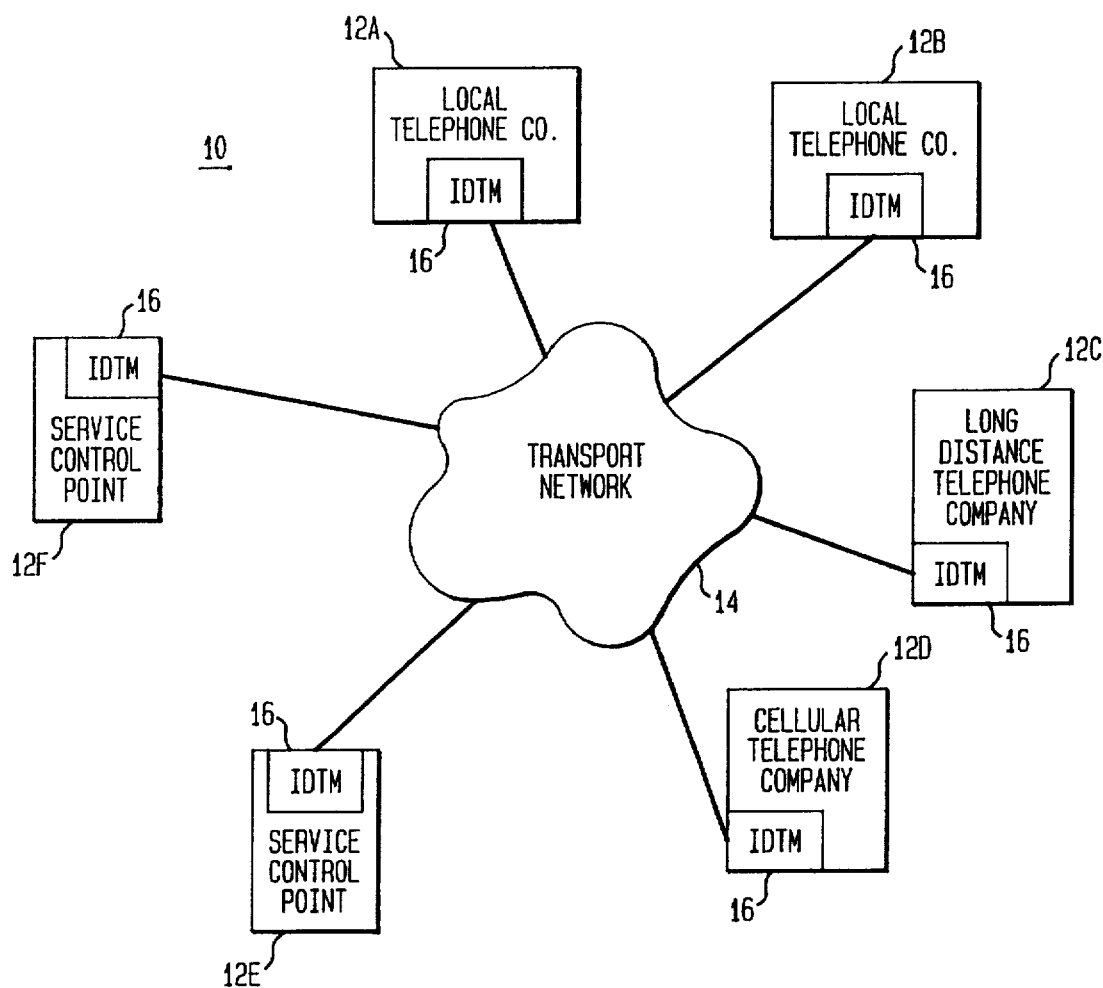
FIG. 1 schematically illustrates a distributed service management system comprising a plurality of individual service management systems, in accordance with an illustrative embodiment of the present invention.

The overall architecture of the distributed service management system of the present invention is illustrated in FIG. 1. The distributed service management system 10 of FIG. 1 comprises a plurality individual service management systems 12-A, 12-B, 12-C, 12-D, 12-E, 12-F, operated by different service providers. For example, the service management system 12-A is operated by a first local telephone company, the service management system 12-B is operated by a second local telephone company, the service management system 12-C is operated by a long distance telephone company, and the service management system 12-D is operated by a personal communication service provider such as a cellular telephone company. Two other individual service management systems, 12-E and 12-F are located at service control points. A service control point (SCP) is a physical communication system which provides call processing functions for a collection of central office switches.

The service management systems are interconnected by the transport network 14. The transport network 14 provides the data and SQL (Standard Query Language) message transport services. The network 14 utilizes the facilities provided by wire based and wireless telephone and other communication networks.

Each individual service management system 12 has a local database (not shown in FIG. 1, but see FIG. 2) which stores, for example, customer profile records and credit records. Each individual service management system also has a database management system for managing its database.

Each individual service management system 12 has an Interactive Distributed Transaction Monitor (IDTM) 16 (see M. Cochinwala, K. C. Lee and W. Mansfield, Jr., "A Distributed Transaction Monitor" Third International Workshop on Research Issues on Data Engineering: INTEROPERABILITY IN MULTIDATABASE SYSTEMS, Vienna, Austria, Apr. 18–20, 1993). The IDTM 16 is an interactive message based interface that allows applications to access the databases at a plurality of the individual service management systems 12. Illustratively, the IDTM's 16 communicate using the transport network 14 using SQL.

Figure 2:
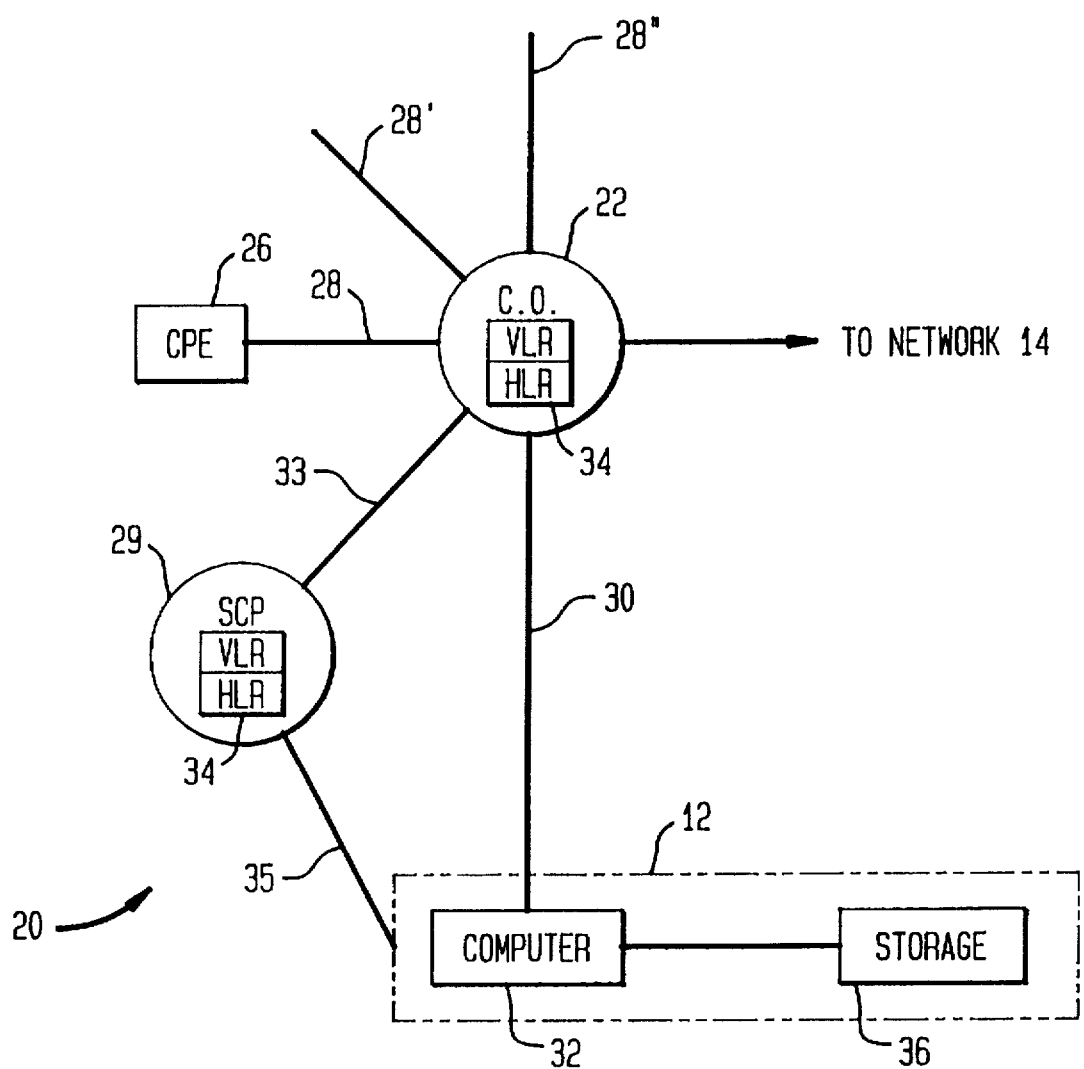
FIG. 2 schematically illustrates the hardware used to implement one of the individual service management systems of the distributed service management system of FIG. 1.

The structure of a service management system 12 is described in greater detail below. FIG. 2 shows a portion 20 of a public switched telephone network belonging to a local telephone network. The network portion 20 forms part of the transport network 14 of FIG. 1. The network portion 20 includes the central office 22. A unit of Customer Premises Equipment (CPE) 26 is connected to the central office 22 by the subscriber loop 28. Numerous other CPE units (not shown) are connected to the central office 22 by other subscriber loops (e.g., 28', 28"). The individual service management system 12 is connected to the central office 22 by the line 30. The network portion 20 also include the service control point (SCP) 29. The SCP 29 is connected to the central office 22 by the line 33 and is connected to the individual service management system 12 by the line 35. The VLR and HLR registers 34 are maintained in the central office 22. Alternatively, the VLR and HLR registers 34' are maintained in the service control point 29. It should be noted that the lines 30, 33 and 35 are part of the transport network 14.

The service management system 12 comprises the computer 32 and the storage 36. The storage 36 stores a database comprising customer profile records and (CPR) and credit records as well as other records for other functions such as telephone number administration. The computer 32 runs a database management system for managing the database stored in the storage 36. The computer 32 also runs application software to control the providing of services in the telephone network (e.g., changing the database to implement call forwarding). The application software can be requested from a unit of CPE (e.g. CPE 26) which communicates with the computer 32 via the central office 22. The computer 32 also performs telephone number administration. The computer 32 also maintains the information required to administer the HLR and VLR 34 or 34'.

In addition, the computer 32 performs service activation by controlling certain hardware elements in the network such as the switching performed by switches in the central office 22. For example, to perform a call forwarding operation, it is necessary to change the switches in the central office 22 so that calls which are normally switched to one CPE are now switched to someplace else. The service control point 29 is also controlled by the computer 32.

Figure 3:
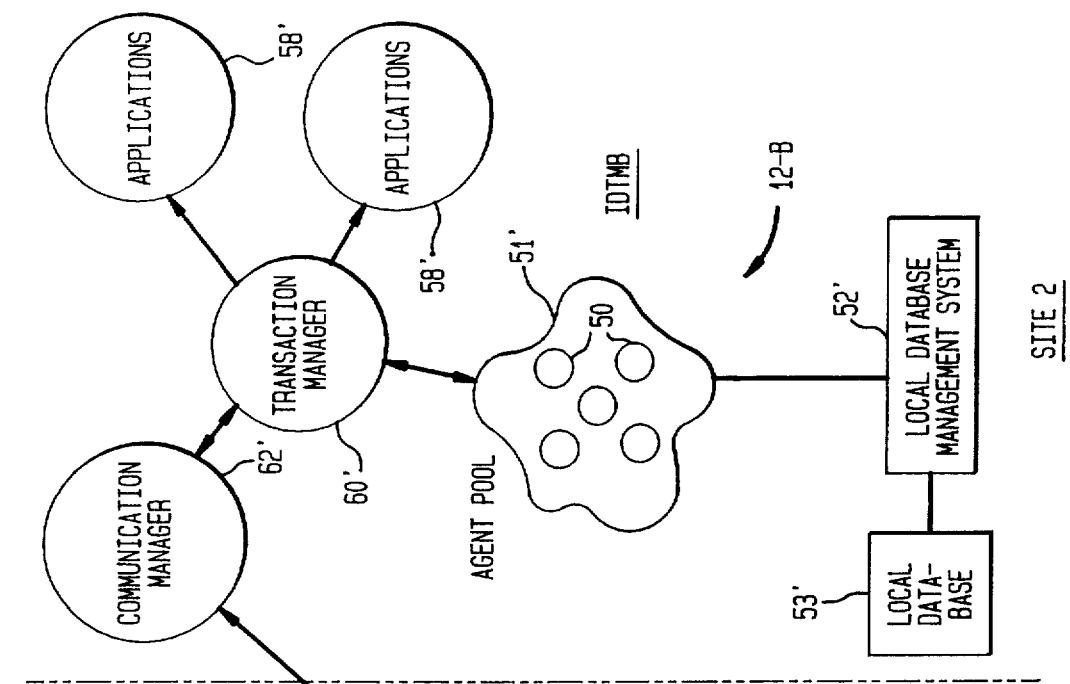
FIG. 3 schematically illustrates an IDTM used at each individual service management system in the distributed service management system of FIG. 1.
Figure 3:
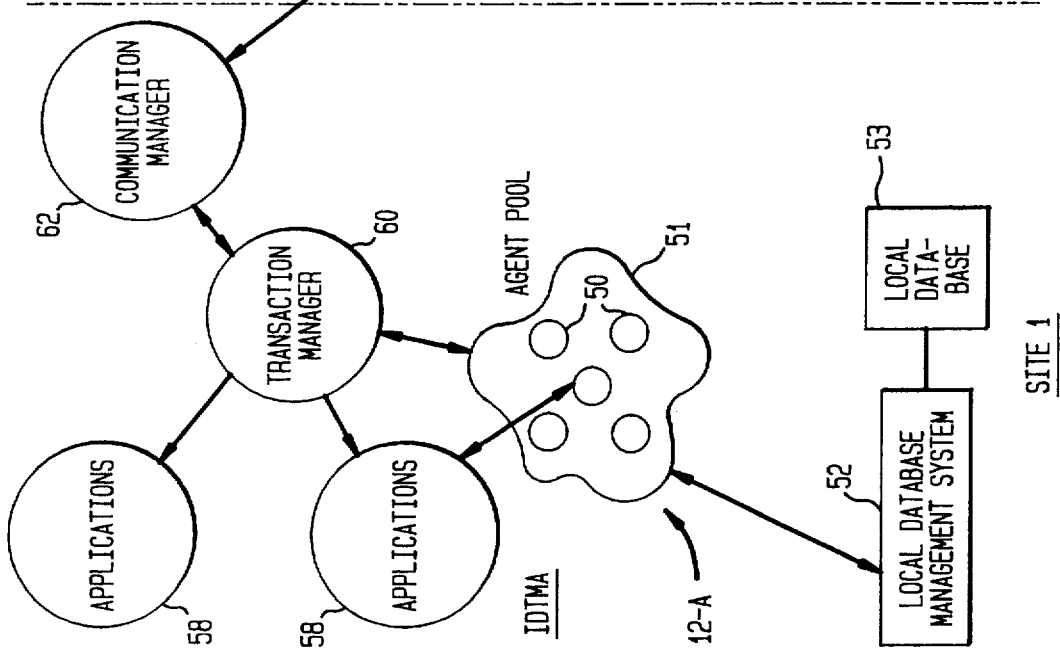

The computer 32 also includes an IDTM (see FIG. 1, FIG. 2 and FIG. 3). This permits the service management system 12 of FIG. 2 to communicate with other service management systems belonging to other service providers (long distance carriers, other local telephone companies) to form the distributed service management system of the present invention. This enables applications at the computer 32 to access databases at other service management systems.

An IDTM is described in greater detail below in connection with FIG. 3. Specifically, FIG. 3 shows two IDTM's labeled IDTM A and IDTM B. The IDTM A is part of a first service management system 12-A located at site 1. Located at site 1 is a computer or other data processing system for implementing the first service management system 12-A. The IDTM B is part of a second service management system 12-B located at site 2. Located at site 2 is a computer or other data processing system for implementing the second service management system 12-B. The service management system 12-A includes the local database management system 52 which manages the data base 53. The service management system 12-B includes the local database management system 52' which manages the local database 53'. The applications 58 run at the service management system 12-A and the applications 58' run at the service management system 12-B.

Each IDTM (e.g., IDTM-A and IDTM-B) integrates multiple databases (e.g., 53, 53') belonging to multiple individual service management systems (e.g., 12-A, 12-B) into a multidatabase transaction management system which is the distributed service management system of the present invention.

The IDTM A comprises a plurality of agents 50 which form an agent pool 51. An agent is a software process that enables an application to access data in a local database. The IDTM-A also comprises a transaction manager 60 and a communication manager 62. The IDTM-B also comprises a plurality of agents 50' which form an agent pool 51'. The IDTM B also comprises a transaction manager 60' and a communication manager 62'. The IDTMs 12-A and 12-B communicate using SQL via the transport network 14 which is connected to the communication managers 62 and 62'.

The agents 50 and 50' encapsulate the local database management systems 52 and 52' and local databases 53 and 53', respectively, by acting as intermediaries between the application 58, 58' and the database management systems (see e.g., J. Pons and J. Vilarem, "Mixed Concurrency Control: Dealing with Heterogeneity in Distributed Database Systems," Proc. of the Fourteenth Conference on VLDB, Los Angeles, 1988). Because of this, when an IDTM is installed in an already existing service management system, the existing service management system, including its database management system, does not have to be modified.

To understand the operation of the IDTMs, it is useful to consider an application 58 at service management system 12-A located at site 1. The application 58 accesses to the local and remote databases (e.g., 53, 53') by first registering with the local transaction manager 60 of IDTM A. When the local transaction manager 60 receives a registration request from a local application 58, the local transaction manager 60 allocates and connects a local agent 50 to the application 58. The allocated agent 50 is called the coordinator agent. The local application 58 may need to access a remote database such as the database 53' of service management system 12-B at site 2. In this case, the local coordinator agent 50 at site 1 will request the local transaction manager 60 to allocate a remote agent 50' at site 2. To allocate the remote agent 50' (called a participant agent), the local transaction manager 60 at site 1 communicates, via the local communication manager 62, the network 14 and the remote communication manager 62' (at site 2), with the transaction manager 60' which allocates the remote participant agent 50'. Then, the application can issue operations on the remote database 53' via the coordinator agent 50 and the participant agent 50'. A channel is set up between the coordinator agent 50 and the participant 50' agent using the network 14.

In general, different kinds of agents are assigned by the transaction manager to different kinds of applications. For example, if an application prefers batched updates, then an agent may be assigned to this application that accumulates update operations to databases. On the other hand, if an application requires a fast response, then an agent optimized for fast response times may be allocated to this application. The agents 50, 50' for performing database access operations are entirely conventional.

Each IDTM agent 50, 50' comprises several modules for performing the following functions: database accesses, persistent storage, concurrency control, commit protocol, and event detection. Applications may use locking or certification techniques for concurrency control over global data.

The IDTM provides a set of functions that simplify the global data access interface. Table 1 lists some interface functions that can be used by an application. In Table 1, there is only included functions that are not generally provided by database management systems or where the parameters are different from those provided by database management systems.

TABLE 1

| | Subset of Interface Functions | | | |
|---|---|---|---|---|
| FUNCTION | IDTM PROCESS | PARA-METER 1 | PARA-METER 2 | RE-TURN |
| register | IDTM Manager | site name | con-currency control | handle |
| open | agent | number of databases | dblist | status |
| begin | agent | concurrency control | null | trans-actionid |
| certify | agent | transaction id | null | status |
| close | agent | null | null | status |
| addtrigger | agent | event | action | trigger id |
| delete-trigger | agent | triggerid | null | status |

Applications can insert event detection rules into an IDTM using the trigger rule management interface (see the second line from the bottom of Table 1). The "addtrigger" function for adding a trigger rule to an IDTM is described by the following four lines of pseudocode:

Addtrigger triggerName triggerContext EVENT eventype
    relationName (list of wildcard attributes names) NULL
    PREDICATE (list of relationName attribute Name
    "attributeValue") NULL ACTION actionHandler
    NULL The "triggerName" specifies the name of the trigger that will be referenced by those applications interested in it. The "triggerContext" contains information such as the security level or other application contexts of the trigger. The "actionHandler" is performed before the triggering transaction commits. A unique trigger identifier will be returned after the "addtrigger" operation. When the EVENT and PREDICATE of the trigger are evaluated true, the trigger rule is fired. After a trigger is added, other applications that know the name of the trigger can add to the notification list of the trigger using an "addtotrigger" operation. After the "addtotrigger" operation is performed, the application will be notified when the trigger is fired.

B. Prototype Service

Figure 4:
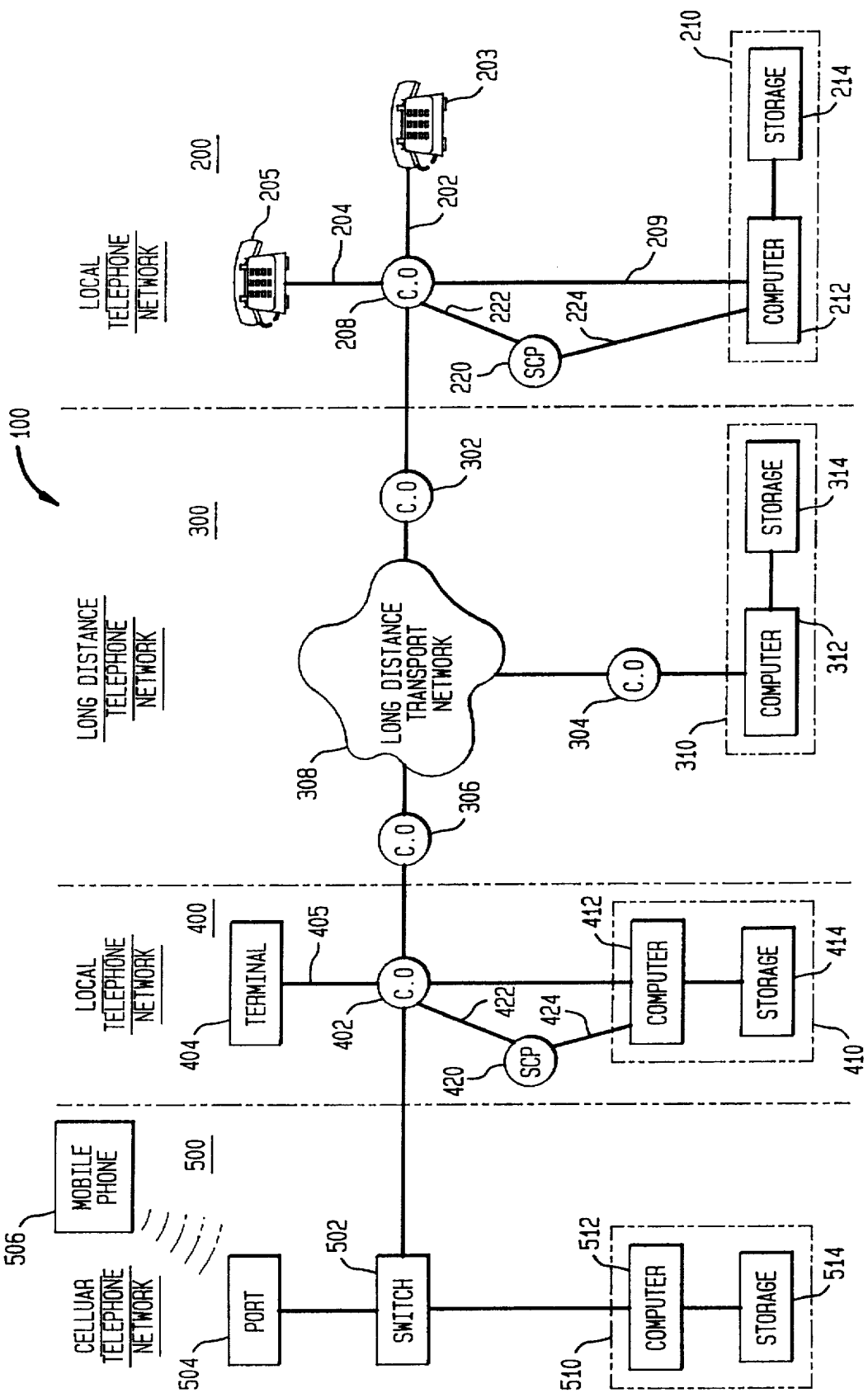
FIG. 4 illustrates a system including the networks of a plurality of service providers and including a distributed service management system according to the invention.

FIG. 4 illustrates a system 100 in which a personalized communication service can be provided to a user. A typical example is the case of a user, who temporarily rents a portable phone at a visiting location. This user wants phone calls directed to his/her home phone to be automatically forwarded to the rented portable phone and wants to restrict incoming calls at the rented portable phone.

The system 100 of FIG. 4 comprises the networks maintained by four service providers. The network 200 is the network of the home local telephone company of the user. As shown in FIG. 4, the network 200 includes a plurality of subscriber lines 202, 204 which connect the CPE units 203, 205 to the central office 208. Illustratively, the CPE unit 203 is the home phone of the user mentioned above. Also connected to the central office 208 by a line 209 is a service management system 210 which is operated by the home local telephone company. The service management system 210 comprises the computer 212 and the storage 214 which stores a database comprised of customer profile records and credit records. The operation of a service management system such as service management system 210 has been described in detail above. The network 200 also contains a service control point 220 which is connected to the central office 208 by the line 222 and the service management system 210 by the line 224.

The network 200 of the home local telephone company is connected to the network 300 of a long distance carrier. A portion of the network 300 is shown in FIG. 4. The network 300 comprises the central offices 302, 304, 306. These central offices are interconnected by a long distance transport network 308.

The central office 208 of the local telephone network 200 is connected to the central office 302 of the long distance telephone network 300. The service management system 310 of the long distance carrier is connected to the central office 304. The service management system 310 comprises the computer 312 and the storage 314.

The network 400 is also a local telephone network. The local telephone network 400 is operated by the visiting local telephone company of the user. The local telephone network 400 includes the central office 402. The central office 402 of the local telephone network 400 is connected to the central office 306 of the long distance network 300. A CPE unit in the form of terminal 404 is also connected to the central office 402 by the subscriber loop 405. The service management system 410 is also connected to the central office 402. The service management system 410 comprises the computer 412 and the storage 414. The network 400 also comprises a service control point 400 which is connected to the central office 402 by the line 422 and to the service management system 410 by the line 424.

The network 500 is the network of a personal communication service provider, in this case, a cellular telephone company. The cellular telephone network 500 includes the switch 502. The switch 502 is connected to the central office 402 of the local telephone network 400. The switch 502 is also connected to a radio port 504 which transmits signals to and receives signals from a plurality of portable telephones such as the portable telephone 506. Also connected to the switch 502 is the service management system 510 which comprises the computer 512 and the storage 514.

Thus, the system 100 of FIG. 4 includes the networks of four service producers. These are the local telephone network 200 of the home local telephone company, the long distance network 300 of the long distance telephone company, the local telephone network 400 of the visiting local telephone company, and the cellular telephone network 500 of the cellular telephone company. Each of these four service providers has its own service management system. These are the service management system 210 of the home local telephone company, the service management system 310 of the long distance telephone company, the service management system 410 of the visiting local distance telephone company, and the service management system 510 of the cellular telephone company.

Each of the individual service management systems has a local database storing customer profile records (CPR) and credit records (CR). The CPR contain information such as name, address, office phone and preferred long distance carrier such as the carrier which operates the network 300. It also contains information about services such as incoming and outgoing call restrictions. The customer credit records contain information about unacceptable users, for example. Each of the individual service management systems also has a database management system for managing the local database.

In accordance with the present invention, the individual service management systems are combined to form a distributed service management system. This is accomplished by providing an IDTM (discussed in detail above) at each individual service management system.

As discussed above, the IDTMs integrate the databases belonging to the multiple individual service management systems into a single multidatabase transaction management environment. Each IDTM comprises a plurality of agents that encapsulate the local database by acting as an intermediary for all applications (remote or local) attempting to access the local database base.

Thus, the service management systems 210, 310, 410, and 510 together form a distributed service management system in accordance with the invention. The distributed service management system permits services to be provided to users across multiple service providers.

Return now to the example of a user who rents a portable phone at an airport and who wants call forwarding and incoming call restriction services. These services can be implemented in a number of ways using the distributed service management system of the present invention.

The implementation of this service illustratively uses the following steps:

1. The call forwarding and call restriction service is implemented by an application which runs in the service management system 510 of cellular telephone network 500. The application may be activated from anywhere, e.g. from the terminal 404 which connects to the service management system 510 via the central office 402 and switch 502, or from the base phone 203 of the user which connects via the system 100 to the service management system 510. The application registers with the transaction manager at the local IDTM (see FIG. 3) and a local coordinator agent is allocated to the application. The local coordinator agent accesses the local data base in the service management system 510 and creates in the database a customer profile record for the user. The coordinator agent inserts the incoming call restriction information and call forwarding information into this record. Using the distributed service management system, the local agent at the service management system 510 arranges for this record to be inserted into the service management systems 410, 310, and 210 of the other service providers. As indicated above, this is accomplished by using the IDTMs at these other service management systems to allocate remote participant agents.

2. Upon receiving the database insertion requests, the service management systems 410, 310, and 210 each determine whether the insertion is acceptable, for example, by checking credit records of the user. If the insertion is acceptable, the customer profile record of the user will be inserted into the local database of each service management system. Otherwise, if the insertion is unacceptable to any one of the service providers, the user will not be able to subscribe to the desired service.

3. Upon insertion of the customer profile record, the service management system 410 will create a VLR including call restriction information. The VLR will be transmitted to a service control point 420 or central office 402 that performs call restriction and routing at the visiting local telephone network.

4. Upon receiving the insertion request of the customer profile record, the long distance carrier service management system 310 determines whether it has coverage at the visiting location and also performs a credit check using the credit records maintained in its database. If both the area of coverage and credit check are positive, the insertion request is granted.

5. Upon receiving the customer profile record insertion request, the home local telephone company, through its service management system 210, will check the customer credit record, create an HLR containing the call forwarding information and VRL location, and down load the HLR to a local service control point (e.g. service control point 220) or central office (e.g. the central office 202) covering the base telephone 203. Then, the call forwarding service is activated by causing the central office 202 to route calls originally directed to the base telephone 203 through the networks 200, 300, and 400 to the mobile phone 506. There are several techniques by which the calls can be forwarded through the networks 200, 300 and 400 and these are discussed below.

6. When the user returns the rented portable phone, the distributed service management system is utilized to remove the customer profile record from all of the databases. The local coordinator agent at the service management 510 deletes this customer profile record from the local database. The local coordinator agent at service management system 510 also arranges for participant agents at the other service management systems 410, 310, 210 to delete this customer profile record. Upon deletion, the home local telephone company deactivates the call forwarding service and deletes the HLR from the service control point or central office which controls the call forwarding. The service management system 410 will delete the VLR for this user.

The call forwarding operation can be carried out in a number of ways described below:

- A call originally directed to the user's base phone can be forwarded to a unique number assigned to the user's portable phone by the personal communication service provider.
- A call originally directed to a user's base phone can be forwarded to a group number assigned to the personal communication service provider. The personal communication service provider maintains a database in a storage device which links a base number provided by the user (e.g. the user's home number or office number or any other base number provided by the user) to the telephone number assigned to the rental portable phone. When an incoming call arrives, the base phone number serves as a key to retrieve the rental phone number. After retrieving the rental phone number, the incoming call is routed to the user.
- This method is the same as the previous method but there is a single nationwide group number. The call is forwarded from the user's base phone to the nationwide group number. There is maintained a centralized database which maps the base number to a group number of a specific personal communication service provider or the number of the rented portable telephone. After an incoming call arrives, the table entry is indexed using the base number of the user. Then the call is forwarded to the appropriate service provider or telephone having the retrieved entry. If the call is routed to the group number of a specific service provider, another table is indexed to obtain the telephone number of the phone to which the call is to be forwarded.

All of these forwarding procedures can be implemented using the distributed service management system of the present invention by inserting the appropriate call forwarding information into the databases of the appropriate service providers.

In short, the provision of a personalized communication service to a user comprises a plurality of database operations including, insertion, record checking and deletion operations. These are carried out across multiple databases of multiple service providers using the distributed service management system and method of the present invention.

It should be noted that some trigger rules may be created to implement a service such as call forwarding to a temporary user of a portable phone. For example, to carry out step 5 by the service management system of the home local company, a trigger rule represented by the following pseudocode may be used:

On insert to CPR, check credit before commit and create (HLR, load service control point, activate call forwarding) after commit.

Conclusion

A distributed service management system has been provided to provide personal communication services across multiple service providers. Finally, the above described embodiments of the invention are intended to be illustrative only. Numerous alternative embodiments and equivalent structures may be devised by those skilled in the art without departing from the scope of the following claims.

What is claimed is:

1. In a communication system including a plurality of distinct communications service providers, each of said service providers comprising a communications network, a database, and a transaction manager in a service management system, a method for forwarding a call to a temporarily utilized portable telephone of a nomadic user at a first communications service provider from a base telephone of said user at a second communications service provider, said method comprising the steps of activating an application at the service management system of said second communications service provider, registering said application with said transaction management system of said second communications service provider, allocating a local agent to said application by said transaction management system of said second communications service provider, using said local agent, accessing the local database of said service management system of said second communications service provider and generating a customer profile record for said user, generating a request by said local agent that at least part of said customer profile record be inserted into a remote database at the service management system of said first communications service provider, determining at said remote database if said insert request is acceptable, and if said insert request is acceptable, then using the call profile record from said second communications service provider to modify the processing of the call in the network of said first communications service provider.

2. The method in accordance with claim 1 wherein said step of modifying the processing of the call in said network of said first communications service provider comprises accessing a table in said first communications service provider with a group telephone number to obtain the temporary portable telephone number of the user, and forwarding the call to said portable telephone of the user using the temporary portable telephone number.

3. The method in accordance with claim 1 wherein said remote database contains a mapping of base telephone numbers of a plurality of users and telephone numbers assigned to portable telephones being temporarily utilized by said users, and wherein said step of modifying the processing of the call in said network of said first communications service provider comprises using the base telephone number of said nomadic user at said second communications service provider to access said remote database to obtain the temporary telephone number of the portable telephone of said nomadic user at said first communications service provider.

* * * * *